A. L. CARTER.
BALL BEARING.
APPLICATION FILED FEB. 10, 1917.
1,242,767.
Patented Oct. 9, 1917.
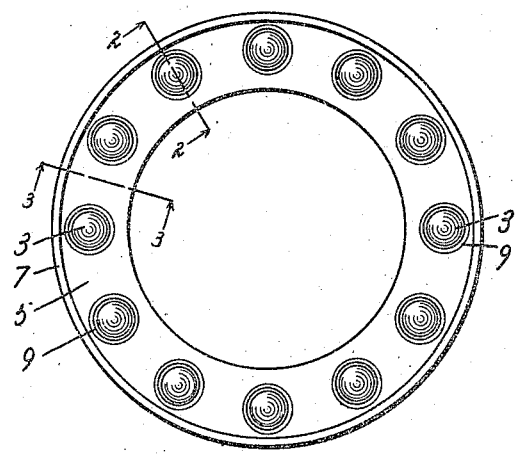
Fig. I.
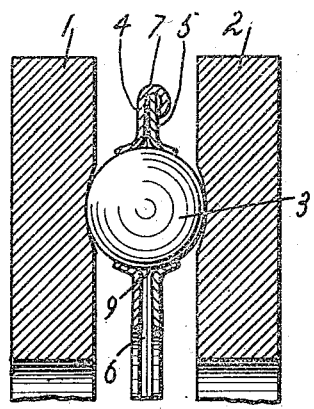
Fig. II.
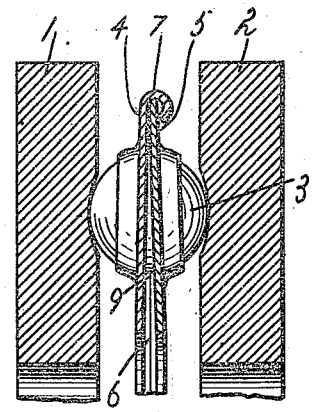
Fig. III.
WITNESSES:
Luther Blake
Olin Harvey
INVENTOR.
ALICK L. CARTER
BY Chappell & Earl
ATTORNEYS.

UNITED STATES PATENT OFFICE.

ALICK L. CARTER, OF COUDERSPORT, PENNSYLVANIA.

BALL-BEARING.

1,242,767.  Specification of Letters Patent.  Patented Oct. 9, 1917.

Application filed February 10, 1917. Serial No. 147,765.

*To all whom it may concern:*

Be it known that I, ALICK L. CARTER, a subject of the King of Great Britain, residing at Coudersport, county of Potter, State of Pennsylvania, have invented certain new and useful Improvements in Ball-Bearings, of which the following is a specification.

This invention relates to improvements in ball bearings, and more particularly to improvements in thrust bearings.

The object of the invention is to provide an improved ball retainer and separator.

I accomplish the objects of my invention by the devices and means described in the following specification. The invention is clearly defined and pointed out in the claims.

A structure which is a preferred embodiment of my invention is illustrated in the accompanying drawing forming a part of this specification, in which:

Figure I is a plan view of the base retainer and separator.

Fig. II is an enlarged detail cross section on line 2—2 of Fig. I, showing the relation of one ball to the retainer and ball races.

Fig. III is an enlarged cross section on line 3—3 of Fig. I.

In the drawing similar numerals refer to similar parts throughout the several views, and the sectional views are taken looking in the direction of the arrows at the ends of the section lines.

In the drawing, 1 and 2 are merely conventional showings of the relatively rotating bearing members having races therein for the reception of bearing balls 3 which are retained in separators formed from two annular plates 4 and 5, respectively, which are slightly dished or convexed so that when their outer edges are placed together, their inner edges will be slightly spaced apart, as indicated at 6. The outer edges of the annular members 4 and 5 are cupped and seamed together, as shown at 7.

The opposed annular plates are perforated and flanged at regularly spaced intervals to form the ball receiving pockets or sockets 9. The flanges are curved to conform to the curvature of the bearing balls and a very small space is left between the bearing balls and the flanges to provide room for a thin film of oil.

By spacing the plates 4 and 5 apart, as indicated at 6, an annular passage way is formed within the ball retainer, which assists the circulation and distribution of the lubricant. Due to the fact that lubricant centrifugally flows outward while the retainer is rotating and is only able to circulate through the ball pockets as the retainer is sealed on its periphery, a continuous washing out, cooling and lubricating of the balls results.

Having thus described my invention, what I claim as new and desire to secure by Letters Patent is:

1. In a thrust bearing, the combination of bearing members, bearing balls, a ball retainer for said balls comprising opposed annular dished plates having their peripheries cupped and seamed together and their inner edges spaced apart, the opposed plates being perforated and flanged to form retaining pockets for said balls and for circulation of lubricant.

2. In a thrust bearing, the combination of bearing members, bearing balls, a ball retainer for said balls comprising opposed annular dished plates having their peripheries in contact and their inner edges spaced apart, the opposed plates being perforated and flanged to form retaining pockets for said balls and for circulation of lubricant.

3. In a thrust bearing, the combination of bearing members, bearing balls, a ball retainer for said balls comprising opposed annular dished plates having their peripheries in contact and their inner edges spaced apart, the opposed plates being conformed to retain said balls and for circulation of lubricant.

4. In a thrust bearing, the combination of bearing members, bearing balls, a ball retainer for said balls comprising opposed annular dished plates having their peripheries in contact and their inner edges spaced apart, the opposed plates being conformed to retain said balls.

In witness whereof, I have hereunto set my hand and seal in the presence of two witnesses.

ALICK L. CARTER. [L. S.]

Witnesses:
 JOHN F. STONE,
 CORA I. ARMSTRONG.